(12) United States Patent
Masuda et al.

(10) Patent No.: US 8,685,506 B2
(45) Date of Patent: Apr. 1, 2014

(54) TABLET AND EXHAUST PIPE INTEGRATED WITH TABLET

(75) Inventors: Noriaki Masuda, Otsu (JP); Kentaro Ishihara, Otsu (JP); Kazuo Kinoshita, Otsu (JP); Katsuhiro Ito, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/386,981

(22) PCT Filed: Aug. 6, 2010

(86) PCT No.: PCT/JP2010/063415
§ 371 (c)(1),
(2), (4) Date: Jan. 25, 2012

(87) PCT Pub. No.: WO2011/019006
PCT Pub. Date: Feb. 17, 2011

(65) Prior Publication Data
US 2012/0128904 A1    May 24, 2012

(30) Foreign Application Priority Data
Aug. 14, 2009  (JP) .................................. 2009-187936

(51) Int. Cl.
*A47G 19/22* (2006.01)
(52) U.S. Cl.
USPC ....................................................... 428/34.4
(58) Field of Classification Search
USPC ....................................................... 428/34.4
See application file for complete search history.

(56) References Cited

U.S. PATENT DOCUMENTS

2006/0105898 A1 * 5/2006 Ide .................................. 501/50

FOREIGN PATENT DOCUMENTS

| JP | 63-315536 | 12/1988 |
| JP | 06-024797 | 2/1994 |
| JP | 2007-210880 | 8/2007 |
| JP | 2007-297266 | 11/2007 |
| JP | 2008-094705 | 4/2008 |
| JP | 2008-098147 | 4/2008 |
| JP | 2008210792 A * | 9/2008 |
| WO | WO 2007099864 A1 * | 9/2007 |
| WO | 2007/114222 | 10/2007 |

OTHER PUBLICATIONS

Machine Translation of JP 2008210792 A; 2008.*
Machine Translation of WO 2007099864 A1; 2007.*
Machine Translation of JP 2008094705 A; 2008.*
Machine Translation of JP 2007297266 A; 2007.*
International Preliminary Report on Patentability and Written Opinion of the International Searching Authority issued Mar. 22, 2012 in International (PCT) Application No. PCT/JP2010/063415.
International Search Report issued Sep. 14, 2010 in International (PCT) Application No. PCT/JP2010/063415.

* cited by examiner

*Primary Examiner* — James Yager
(74) *Attorney, Agent, or Firm* — Wenderoth, Lind & Ponack, L.L.P.

(57) ABSTRACT

A tablet includes a bismuth-based glass and a refractory filler, wherein the bismuth-based glass comprises, as a glass composition, in terms of mass %, 70 to 90% of $Bi_2O_3$, 2 to 12% of $B_2O_3$, 0 to 5% of $Al_2O_3$, 1 to 15% of ZnO, 0 to 10% of BaO, and 0 to 8% of $CuO+Fe_2O_3$; the tablet comprises 1 to 25 vol % of alumina as the refractory filler; and the filling ratio of the tablet is 71% or more.

10 Claims, 2 Drawing Sheets

TABLET AND EXHAUST PIPE INTEGRATED WITH TABLET

BACKGROUND OF THE INVENTION

I. Technical Field

The present invention relates to a tablet suitable for sealing an exhaust pipe and an exhaust pipe integrated with a tablet, and more particularly, to a tablet suitable for sealing an exhaust pipe of a plasma display panel (hereinafter, referred to as "PDP"), various types of a field emission display (hereinafter, referred to as "FED"), or a vacuum fluorescent display (hereinafter, referred to as "VFD") and an exhaust pipe integrated with a tablet.

II. Description of the Related Art

A composite material containing a glass and a refractory filler is generally used as a sealing material. The sealing material is more excellent in chemical durability and heat resistance, and is more suitable for ensuring airtightness than an organic adhesive material.

The sealing material is required to have properties such as mechanical strength, flowability, electrical insulation, and low-melting property, depending upon the application. In particular, in the case of using the sealing material in a PDP or the like, it is required that the sealing material can be sealed at a temperature (for example, 500° C. or less) at which the fluorescent property of a fluorescent substance is not degraded. Hitherto, lead-borate glass, which satisfies the properties, has been widely used (see JP 63-315536 A).

However, environmental problems concerning PbO contained in the lead-borate glass have been pointed out recently. Therefore, it is desired that the lead-borate glass be replaced by lead-free glass, and various lead-free glasses have been developed currently. In particular, bismuth-based glass (Bi2O3-B2O3-based glass) described in JP 06-24797 A or the like is substantially similar to the lead-borate glass in various properties such as a thermal expansion coefficient. Therefore, the bismuth-based glass is expected as an alternative candidate for the lead-borate glass.

Meanwhile, in the case of the PDP or the like, the inside of a device is exhausted and then filled with noble gas, and hence it is necessary to attach an exhaust pipe. Such the exhaust pipe is attached so that the position of an exhaust hole provided in a glass substrate of the PDP is matched with an opening of a front end portion of the exhaust pipe.

In general, in attaching the exhaust pipe, a tablet (also, referred to as "press frit" or the like) obtained by molding a sealing material is used. when the tablet is used, the alignment between the exhaust hole of the glass substrate and the opening of the front end portion of the exhaust pipe becomes easy, and the exhaust pipe can be attached to the glass substrate stably. Further, when the tablet is softened, the exhaust pipe can be sealed to the glass substrate.

SUMMARY OF THE INVENTION

A production process for the PDP includes a primary firing step, a secondary firing step, and a vacuum exhaust step. The primary firing step is a step involving decomposing and volatilizing a resin in a paste applied onto a glass substrate to smoothen the surface of a coating film, and is generally called a glazing step. The secondary firing step is a step involving sealing glass substrates (front glass substrate and back glass substrate) to each other and sealing the glass substrates and an exhaust pipe, and is generally called a sealing step. The vacuum exhaust step is a step involving exhausting the inside of a device in vacuum and filling the inside of the device with noble gas.

In general, the primary firing step and the secondary firing step are conducted in an air atmosphere, and the vacuum exhaust step is conducted in a high-vacuum reduced pressure atmosphere. Recently, an attempt to raise a temperature in the vacuum exhaust step has been studied. As the vacuum exhaust is conducted at a higher temperature (specifically, 450 to 500° C.), the inside of a device becomes a high-vacuum state in a shorter period of time. Therefore, the production efficiency of the PDP can be enhanced remarkably. Further, when the vacuum exhaust is conducted at a high temperature, the amount of remaining gas and the content of impurities in the device become smaller, in other words, the vacuum degree in the device increases. Therefore, the purity of noble gas in the device can be enhanced, and the brightness property of the PDP can be enhanced.

However, when the vacuum exhaust step is conducted at a high temperature, there may be disadvantages in that a tablet is re-softened in the vacuum exhaust step to be drawn into the device, an exhaust pipe is displaced to close an exhaust hole, and a hole is opened in the tablet to impair the airtightness of the device. Besides, the mechanical strength of a sealing portion is degraded and the airtightness reliability of the PDP is liable to decrease.

When the softening temperature of the tablet is raised, the re-softening of the tablet can be prevented in the vacuum exhaust step. However, when the softening temperature of the tablet is raised, it becomes difficult to seal the glass substrate and the exhaust pipe in the secondary firing step, and as a result, the airtightness in the device becomes difficult to be ensured.

Thus, a technical object of the present invention is to enhance the production efficiency and brightness property of a PDP or the like by devising a tablet, comprising bismuth-based glass and a refractory filler, which is capable of sealing an exhaust pipe satisfactorily in a secondary firing step and is difficult to be re-softened in a vacuum exhaust step.

The inventors of the present invention have made extensive studies. As a result, the inventors have found that the above-mentioned technical problem can be solved by adding alumina as a refractory filler and regulating the filling ratio of a tablet to a predetermined range, while restricting the glass composition range of bismuth-based glass, and has proposed the finding as the present invention. That is, a tablet of the present invention comprises bismuth-based glass and a refractory filler, wherein: (1) the bismuth-based glass comprises, as a glass composition, in terms of mass %, 70 to 90% of $Bi_2O_3$, 2 to 12% of $B_2O_3$, 0 to 5% of $Al_2O_3$, 1 to 15% of ZnO, 0 to 10% of BaO, and 0 to 8% of $CuO+Fe_2O_3$ (total content of CuO and $Fe_2O_3$); (2) the tablet comprises 1 to 25 vol % of alumina as the refractory filler; and (3) the filling ratio of the tablet is 71% or more. Here, the "filing ratio" refers to a value [(Actually measured density of tablet)/(theoretical density of tablet)]×100(%). It should be noted that the actually measured density of a tablet can be measured by a well-known Archimedes method or the like. Further, the theoretical density of a tablet can be calculated from the density and the mixing ratio of the respective constituent materials.

The tablet of the present invention restricts the glass composition range of the bismuth-based glass to the above range. Thus, the thermal stability of the bismuth-based glass is enhanced, which makes the bismuth-based glass hard to devitrify in the secondary firing step to increase the sealing strength of the exhaust pipe. Further, this decreases the softening point of the bismuth-based glass, and hence, allows an exhaust pipe to be easily sealed in the secondary firing step.

The tablet of the present invention contains 1 to 25 vol % of alumina as a refractory filler. When 1 vol % or more of alumina is added as a refractory filler, the deformation of the tablet can be prevented during firing, which makes the tablet hard to be drawn into a device in the vacuum exhaust step. On the other hand, when the content of alumina is restricted to 25 vol % or less, the situation in which the tablet does not flow in the secondary firing step can be prevented. That is, to restrict the content of alumina to 1 to 25 vol % makes the tablet hard to be drawn into the device in the vacuum exhaust step while securing the flowability of the tablet in the secondary firing step. As a result, the vacuum exhaust step can be conducted at a higher temperature, and thereby the production efficiency and brightness property of the PDP can be enhanced.

The filling ratio of the tablet of the present invention is 71% or more. As the filling ratio is higher, it becomes more hard for the tablet to undergo a dimensional change in the secondary firing step, that is, it becomes more hard for the tablet to contract in the secondary firing step. Therefore, the flowability of the tablet is enhanced in the secondary firing step, and the sealing strength of the exhaust pipe can be enhanced.

In the tablet of the present invention, the average particle diameter $D_{50}$ of the alumina is preferably 1 to 25 µm. Further, in the tablet of the present invention, the 10% particle diameter $D_{10}$ of the alumina is preferably 0.1 to 5 µm and/or the 90% particle diameter $D_{90}$ of the alumina is preferably 10 to 70 µm. Here, the "average particle diameter $D_{50}$" refers to a value measured by laser diffractometry and represents, in a cumulative particle size distribution curve in terms of volume prepared based on the measurements by laser diffractometry, a particle diameter at which the cumulative amount of particles starting from a particle having the smallest diameter reaches 50%. Further, the "10% particle diameter $D_{10}$" refers to a value measured by laser diffractometry and represents, in a cumulative particle size distribution curve in terms of volume prepared based on the measurements by laser diffractometry, a particle diameter at which the cumulative amount of particles starting from a particle having the smallest diameter reaches 10%. Further, the "90% particle diameter $D_{90}$" refers to a value measured by laser diffractometry and represents, in a cumulative particle size distribution curve in terms of volume prepared based on the measurements by laser diffractometry, a particle diameter at which the cumulative amount of particles starting from a particle having the smallest diameter reaches 90%.

The tablet of the present invention preferably further comprises willemite as the refractory filler.

In the tablet of the present invention, the content of the bismuth-based glass is preferably 40 to 90 vol % and the content of the refractory filler is preferably 10 to 60 vol %.

The tablet of the present invention preferably has a through-hole. Also, the tablet of the present invention preferably has a maximum thickness of 2 mm or less.

It is preferable that the tablet of the present invention be substantially free of PbO. It should be noted that the "substantially free of PbO" refers to the case where the content of PbO in the tablet is 1000 ppm or less.

The tablet of the present invention can be used for sealing an exhaust pipe. The tablet of the present invention preferably has a recessed portion for accommodating an exhaust pipe. The tablet of the present invention can be used for sealing an exhaust pipe of a PDP.

The exhaust pipe integrated with a tablet according to the present invention comprises the tablet as mentioned above which is provided to an enlarged front end portion of an exhaust pipe. Here, the "front end portion of an exhaust pipe" refers to a portion having a front surface to be contact with a glass substrate and an outer circumferential surface with an enlarged diameter. Further, the tablet may be adhered to part of the front end portion of the exhaust pipe.

FIG. 1 shows an example of such exhaust pipe integrated with a tablet. FIG. 1 is a schematic cross-sectional view of the exhaust pipe integrated with a tablet, in which the front end portion of an exhaust pipe 1 has an enlarged outer diameter, and a tablet 2 is adhered to the front surface of the front end portion of the exhaust pipe.

The exhaust pipe integrated with a tablet according to the present invention may comprise the tablet as mentioned above and a high-melting-point ring each of which is provided to an enlarged front end portion of the exhaust pipe, wherein the tablet is positioned at a front side of the enlarged front end portion and the high-melting-point ring is positioned at a rear side of the enlarged front end portion. Here, the "high-melting-point ring" refers to a member that has a ring shape and is not softened and deformed at a temperature of 530° C. or less.

FIG. 2 shows an example of an exhaust pipe integrated with a tablet with such construction. FIG. 2 is a schematic cross-sectional view of the exhaust pipe integrated with a tablet, in which the front end portion of an exhaust pipe 1 has an enlarged outer diameter, and a tablet 2 is adhered to the outer circumferential surface of the front end portion (flange portion 1a) of the exhaust pipe 1. The high-melting-point ring 3 is not adhered to the outer circumferential surface of the front end portion 1a of the exhaust pipe 1. In addition, the tablet 2 is positioned at a front side of the enlarged front end portion 1a and the high-melting-point ring 3 is positioned at a rear side of the enlarged front end portion 1a.

DETAILED DESCRIPTION OF THE INVENTION

Figure 1:
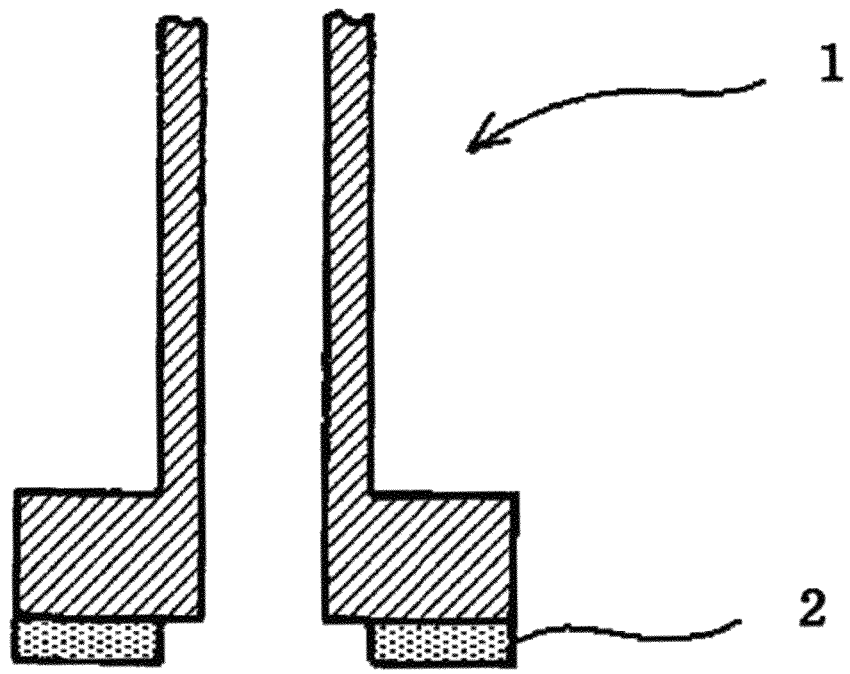
FIG. 1 is a schematic cross-sectional view showing an exhaust pipe integrated with a tablet according to the present invention.
Figure 2:
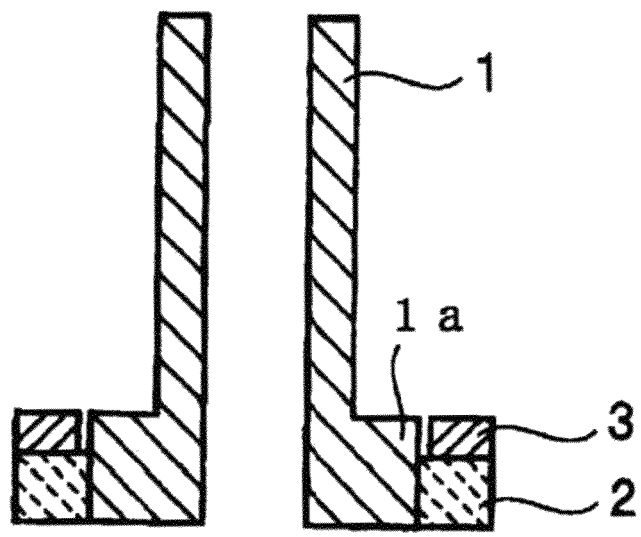
FIG. 2 is a schematic cross-sectional view showing an exhaust pipe integrated with a tablet according to the present invention.

The reasons for restricting the glass composition range of bismuth-based glass in a tablet of the present invention to the above-mentioned range are described below.

$Bi_2O_3$ is a main component that lowers a softening point. The content of $Bi_2O_3$ is 70 to 90%, preferably 71 to 84%, more preferably 73 to 82%, still more preferably 75 to less than 77%. When the content of $Bi_2O_3$ is less than 70%, the softening point of glass becomes too high, which makes it difficult to seal an exhaust pipe in a secondary firing step. On the other hand, when the content of $Bi_2O_3$ is more than 90%, glass becomes thermally unstable and liable to denitrify during melting or firing.

$B_2O_3$ is a component that forms a glass network of bismuth-based glass and is an essential component. The content of $B_2O_3$ is 2 to 12%, preferably 3 to 10%, more preferably 4 to 10%, still more preferably 5 to 9.6%. When the content of $B_2O_3$ is less than 2%, glass becomes thermally unstable and liable to devitrify during melting or firing. On the other hand, when the content of $B_2O_3$ is more than 12%, the viscosity of glass becomes too high, which makes it difficult to seal an exhaust pipe in the secondary firing step.

A mass ratio $Bi_2O_3/B_2O_3$ is a component ratio that largely influences the thermal stability and softening property of bismuth-based glass. Further, in the bismuth-based glass, $Bi_2O_3$ and $B_2O_3$ are main components that form a network of glass and determine the properties of the bismuth-based glass as the content ratio of the components in a glass composition is high. $Bi_2O_3$ is a component that lowers the softening point of glass, and as the content of $Bi_2O_3$ increases with respect to $B_2O_3$, the softening point of glass tends to decrease. On the other hand, the thermal stability of glass becomes poor and glass is liable to devitrify. Further, $B_2O_3$ is a component that enhances the thermal stability of glass, and as the content of $B_2O_3$ increases with respect to $Bi_2O_3$, the thermal stability of glass is enhanced. On the other hand, the softening point of glass tends to increase. Thus, $Bi_2O_3$ and $B_2O_3$ have the properties in a trade-off relationship, and the softening point and thermal stability of glass can be optimized by regulating the value of the mass ratio $Bi_2O_3/B_2O_3$ in a predetermined range. Thus, the situation in which the tablet is drawn into a device in the vacuum exhaust step can be prevented easily while the flowability of the tablet in the secondary firing step is ensured. It is preferred that the value of the mass ratio $Bi_2O_3/B_2O_3$ be 11 or less, 4.5 to 10.8, 8.6 to 10.2, in particular, 7.8 to 9.9. When the value of the mass ratio $Bi_2O_3/B_2O_3$ is more than 11, although the softening point of glass is lowered, glass is liable to devitrify in the secondary firing step or the tablet is liable to be drawn into the device in the vacuum exhaust step.

$Al_2O_3$ is a component that enhances the weather resistance of glass. The content of $Al_2O_3$ is 0 to 5%, preferably 0 to 2%. When the content of $Al_2O_3$ is more than 5%, the softening point of glass becomes too high, which makes it difficult to seal an exhaust pipe in the secondary firing step.

ZnO is a component that prevents the devitrification of glass during melting or firing. The content of ZnO is 1 to 15%, preferably 2 to 11%, more preferably 3 to 9%, still more preferably 4 to 8%. When the content of ZnO is less than 1%, it becomes difficult to prevent the devitrification of glass during melting or firing. When the content of ZnO is more than 15%, a glass composition loses its component balance, with the result that the thermal stability of glass is degraded and glass is liable to devitrify to the worse.

MgO+CaO+SrO+BaO (total content of MgO, CaO, SrO, and BaO) is a component that prevents the denitrification of glass during melting or firing. It is preferred that the content of MgO+CaO+SrO+BaO be 0 to 15%, 1 to 10%, in particular, 3 to 7%. When the content of MgO+CaO+SrO+BaO is more than 15%, the softening point of glass becomes too high, which makes it difficult to seal an exhaust pipe in the secondary firing step.

It is preferred that the content of each component MgO, CaO, and SrO be 0 to 5%, in particular, 0 to 2%. When the content of each component is more than 5%, glass is liable to devitrify or undergo phase separation.

The content of BaO is 0 to 10%, preferably 1 to 8%, more preferably 3 to 7%. When the content of BaO is more than 10%, a glass composition loses its component balance, with the result that the thermal stability of glass is degraded and glass is liable to devitrify to the worse.

$CuO+Fe_2O_3$ is a component that prevents the devitrification of glass during melting or firing, and it is preferred that the content of $CuO+Fe_2O_3$ be 0 to 8%, in particular, 1 to 5%. When the content of $CuO+Fe_2O_3$ is more than 8%, glass is liable to devitrify. It should be noted that, from the viewpoint of surely enhancing the thermal stability of glass, it is preferred that the CuO be added in a trace amount, and the content of CuO be 0.01% or more, 0.1% or more, in particular, 1 to 5% or more. Similarly, from the viewpoint of surely enhancing the thermal stability of glass, it is preferred that $Fe_2O_3$ be added in a trace amount, and the content of $Fe_2O_3$ be 0.01 to 3% or more, in particular, 0.1 to 2% or more.

$Sb_2O_3$ is a component that prevents the devitrification of glass, and it is preferred that the content of $Sb_2O_3$ be 0 to 5%, 0 to 2%, in particular, 0.1 to 1%. $Sb_2O_3$ has an effect of stabilizing network of bismuth-based glass, and if $Sb_2O_3$ is added in an appropriate amount in bismuth-based glass, it becomes difficult for the thermal stability of glass to decrease even in the case where the content of $Bi_2O_3$ is large, for example, the content of $Bi_2O_3$ is 75% or more. However, when the content of $Sb_2O_3$ is more than 5%, a glass composition loses its component balance, with the result that the thermal stability of glass is degraded and glass is liable to devitrify. It should be noted that, from the viewpoint of enhancing the thermal stability of glass effectively, it is preferred that $Sb_2O_3$ be added in a trace amount, and the content of $Sb_2O_3$ be 0.1% or more, in particular, 0.4% or more.

$CeO_2$ is a component that prevents the devitrification of glass during melting or firing, and it is preferred that the content of $CeO_2$ be 0 to 5%, 0 to 2%, in particular, 0 to 1%. When the content of $CeO_2$ is more than 5%, a glass composition loses its component balance, with the result that the thermal stability of glass is degraded and glass is liable to devitrify. It should be noted that, from the viewpoint of enhancing the thermal stability of glass, it is preferred that $CeO_2$ be added in a trace amount, and the content of $CeO_2$ be 0.01% or more.

In addition to the above-mentioned components, the following components can be added to the glass composition.

$SiO_2$ is a component that enhances the weather resistance of glass, and it is preferred that the content of $SiO_2$ be 0 to 10%, in particular, 0 to 3%. When the content of $SiO_2$ is more than 10%, the softening point of glass becomes too high, which makes it difficult to seal an exhaust pipe in the secondary firing step.

$WO_3$ is a component that prevents the devitrification of glass, and it is preferred that the content of $WO_3$ be 0 to 10%, in particular, 0 to 2%. When the content of $WO_3$ is more than 10%, a glass composition loses its component balance, with the result that the thermal stability of glass is degraded and glass is liable to devitrify.

$In_2O_3+Ga_2O_3$ (total content of $In_2O_3+Ga_2O_3$) is a component that prevents the devitrification of glass, and it is preferred that the content of $In_2O_3+Ga_2O_3$ be 0 to 3%. However, when the content of $In_2O_3+Ga_2O_3$ is more than 5%, a glass composition loses its component balance, with the result that the thermal stability of glass is degraded and glass is liable to devitrify. It should be noted that it is preferred that the content of $In_2O_3$ be 0 to 1% and the content of $Ga_2O_3$ be 0 to 0.5%.

The following oxides $Li_2O$, $Na_2O$, $K_2O$, and $Cs_2O$ are components that lower the softening point of glass. However, these oxides each have the function of accelerating the devitrification of glass during melting. Therefore, it is preferred that the total content of these oxides be 2% or less.

$P_2O_5$ is a component that prevents the denitrification of glass during melting. However, when the content of $P_2O_5$ is more than 1%, glass is liable to undergo phase separation during melting.

$MoO_3$, $La_2O_3$, $Y_2O_3$, and $Gd_2O_3$ are components that prevent the phase separation of glass during melting. However, when the total content of these components is more than 3%, the softening point of glass becomes too high, which makes it difficult to seal an exhaust pipe in the secondary firing step.

It should be noted that other components can be added to the glass composition in such a range that the properties of glass are not impaired (preferably 15% or less, in particular, 5% or less).

The present invention does not exclude a case of the tablet being crystallizable. However, it is preferred that the tablet of the present invention be non-crystallizable. Regarding a crystallizable tablet, once a crystal is precipitated in bismuth-based glass, bismuth-based glass becomes hard to be softened and deformed, which can prevent the situation in which the tablet is drawn into a device in the vacuum exhaust step. However, it is difficult to control the precipitation period of a crystal in the crystallizable tablet, and the crystal may be precipitated before the tablet is softened and deformed in the secondary firing step, which degrades the sealing strength of an exhaust pipe remarkably. On the other hand, regarding a non-crystallizable tablet, it is not necessary to control the precipitation period of a crystal, and the situation does not occur in which the crystal is precipitated before the tablet is softened and deformed in the secondary firing step. Therefore, the sealing strength of an exhaust pipe can be surely enhanced. Here, the "non-crystallizable" means that no crystallization peak appears at a temperature of 550° C. or less, preferably 570° C. or less, when a mixed sample of bismuth-based glass powder and refractory filler powder before producing a tablet is subjected to differential thermal analysis. If the surface of a tablet after the vacuum exhaust step exhibits gloss, it can be considered that no crystallization peak appears at a temperature of 550° C. or less at least in the above-mentioned analysis. It should be noted that the differential thermal analysis is conducted in the atmosphere, and the measurement is started from room temperature at a rate of temperature increase of 10° C./min.

The tablet of the present invention contains, as a refractory filler, 1 to 25 vol %, preferably 2.5 to 18 vol %, more preferably 3 to 14 vol % of alumina. Alumina is a component that prevents the deformation of the tablet during firing. However, when the content of alumina is less than 1 vol %, the tablet is liable to be deformed during firing, and hence, the tablet is liable to be drawn into a device in the vacuum exhaust step. On the other hand, when the content of alumina is more than 25 vol %, the flowability of the tablet is lost in the secondary firing step, with the result that the sealing strength of an exhaust pipe is liable to decrease.

In the tablet of the present invention, it is preferred that the 10% particle diameter $D_{10}$ of alumina be 0.1 to 5 μm, in particular, 1 to 4 μm. When the 10% particle diameter $D_{10}$ of alumina is less than 0.1 μm, alumina is liable to melt into glass in the secondary firing step. Therefore, the flowability of the tablet is lost, with the result that the sealing strength of an exhaust pipe is liable to decrease. On the other hand, when the 10% particle diameter $D_{10}$ of alumina is more than 5 μm, the tablet is liable to be deformed, and hence, the tablet is liable to be drawn into a device in the vacuum exhaust step.

In the tablet of the present invention, it is preferred that the average particle diameter $D_{50}$ of alumina be 1 to 25 μm, in particular, 3 to 10 μm. When the average particle diameter $D_{50}$ of alumina is less than 1 μm, alumina is liable to melt into glass easily in the secondary firing step. Therefore, the flowability of the tablet is lost, with the result that the sealing strength of an exhaust pipe is liable to decrease. On the other hand, when the average particle diameter $D_{50}$ of alumina is more than 25 μm, the tablet is liable to be deformed, and hence, the tablet is liable to be drawn into a device in the vacuum exhaust step.

In the tablet of the present invention, the 90% particle diameter $D_{90}$ of alumina is preferably 10 to 70 μm, more preferably 10 to 30 μm. When the 90% particle diameter $D_{90}$ of alumina is less than 10 μm, alumina is liable to melt into glass in the secondary firing step. Therefore, the flowability of the tablet is lost, with the result that the sealing strength of an exhaust pipe is liable to decrease. On the other hand, when the 90% particle diameter $D_{90}$ of alumina is more than 70 μm, the tablet is liable to be deformed, and hence, the tablet is liable to be drawn into a device in the vacuum exhaust step.

In the tablet of the present invention, it is preferred that the specific surface area of alumina be 0.1 to 3 $m^2/g$, in particular, 0.5 to 2 $m^2/g$. When the specific surface area of alumina is less than 0.1 $m^2/g$, the tablet is liable to be deformed, and hence, the tablet is liable to be drawn into a device in the vacuum exhaust step. On the other hand, when the specific surface area of alumina is more than 3 $m^2/g$, alumina is liable to melt into glass in the secondary firing step. Therefore, the flowability of the tablet is lost, with the result that the sealing strength of an exhaust pipe is liable to decrease. Here, the "specific surface area" refers to a value measured by a gas adsorption BET method, and a value measured by a method compliant with JIS R1626.

In the tablet of the present invention, the contents of the bismuth-based glass and the refractory filler are preferably 40 to 90 vol % for bismuth-based glass and 10 to 60 vol % refractory filler, more preferably 50 to 75 vol % bismuth-based glass and 25 to 50 vol % refractory filler. The reasons for restricting the contents to the above range are as described below. When the content of the refractory filler is less than 10 vol %, it becomes difficult to match the thermal expansion coefficient of the tablet with that of an exhaust pipe or the like, and a sealing portion, the exhaust pipe, and the like are liable to be broken owing to a residual stress. On the other hand, when the content of the refractory filler is more than 60 vol %, the content of the bismuth-based glass becomes relatively small, and hence, the reactivity between the bismuth-based glass and the exhaust pipe decreases, with the result that the sealing strength of the exhaust pipe is liable to decrease.

As the refractory filler, there may be used, as well as alumina, materials such as willemite, zircon, zirconium phosphate, zirconium phosphate tungstate, zirconium tungstate, tin oxide, cordierite, β-eucryptite, aluminum titanate, celsian, quartz glass, mullite, β-spodumene, and alumina-silica-based ceramics. In particular, willemite has satisfactory compatibility with the bismuth-based glass, and hence hardly causes the denitrification of the bismuth-based glass during firing. Besides, willemite is low in expansive property and excellent in mechanical strength.

The tablet of the present invention does not exclude a case of the bismuth-based glass and the refractory filler both containing PbO. However, as described above, it is preferred that the bismuth-based glass and the refractory filler be substantially free of PbO from the environmental viewpoint. Further, when the tablet contains PbO, $Pb^{2+}$ may diffuse during firing to degrade the electrical insulation of a sealing portion.

The tablet of the present invention can be produced by the following process. First, bismuth-based glass powder and refractory filler powder are mixed to produce mixed powder. Then, a binder and a solvent are added to the mixed powder to produce a slurry. Next, the slurry is placed in a granulation device such as a spray dryer to produce granulated powder. At this time, the granulated powder is heat-treated at a temperature (for example, about 100 to 200° C.) at which the solvent is volatilized. Then, the produced granulated powder is placed in a mold with a predetermined size, and then subjected to dry press molding to produce a pressed body. After that, the binder remaining in the pressed body is decomposed and volatilized in a firing furnace such as a belt furnace and the pressed body is fired at a temperature at which the bismuth-based glass is softened. Thus, a tablet is produced. The filling ratio of the tablet can be adjusted by the filling ratio of granulated powder in the mold, a press pressure, and the like.

As the binder to be used for the preparation of the slurry, there may be used an acrylic resin, ethylcellulose, polyethylene glycol, a polyethylene glycol derivative, nitrocellulose, polymethylstyrene, polyethylene carbonate, a methacrylic acid ester, and the like. In particular, an acrylic resin and low-molecular polyethylene glycol are satisfactory in thermal decomposition property.

As the solvent to be used for the preparation of the slurry, there may be used N,N'-dimethylformamide (DMF), α-terpineol, a higher alcohol, γ-butyrolactone (γ-BL), tetralin, butylcarbitol acetate, ethyl acetate, isoamyl acetate, diethylene glycol monoethyl ether, diethylene glycol monoethyl ether acetate, benzyl alcohol, toluene, 3-methoxy-3-methylbutanol, water, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, DMF and toluene each have a suitable boiling point for the preparation of the granulated powder and are also satisfactory in solubility for the binder.

It is preferred that the particle diameter of the granulated powder be 20 to 250 μm. This enhances the filling property of the granulated powder in the mold, and hence allows the filling ratio of the tablet to be enhanced easily. Further, when the tablet is heat-treated a plurality of times at a temperature at which the bismuth-based glass is softened, the mechanical strength of the tablet is enhanced, and the loss, damage, and the like of the tablet can be prevented.

In the tablet of the present invention, it is preferred that the filling ratio be 71% or more, 75% or more, 80% or more, in particular, 83% or more. This makes the tablet hard to undergo a dimensional change in the secondary firing step, i.e., the tablet becomes hard to contract in the secondary firing step. Hence, the flowability of the tablet can be enhanced and the sealing strength of an exhaust pipe can be enhanced.

The shape of the tablet of the present invention is not limited, and may be a shape of a ring, a cylinder, a triangular prism, a quadrangular prism, or the like. In particular, in the case where the sealing of an exhaust pipe is assumed, it is preferred that the tablet have a shape with a through-hole, and the through-hole have a diameter substantially equal to that of the opening of a front end portion of an exhaust pipe or an exhaust hole of a glass substrate. This can easily enhance the exhaust efficiency inside a device. Further, it is preferred that the tablet of the present invention have a maximum thickness (generally, thickness of the front end portion) of 2 mm or less, 1.8 mm or less, in particular, 1.5 mm or less. When the maximum thickness is set to be smaller, the heat conductivity of the tablet is enhanced in the secondary firing step. Therefore, the reactivity between the bismuth-based glass and the exhaust pipe is enhanced, which allows the sealing strength of the exhaust pipe to be enhanced easily. On the other hand, when the maximum thickness is more than 2 mm, the heat conductivity of the tablet decreases in the secondary firing step, and the sealing strength of the exhaust pipe is liable to decrease. However, when the maximum thickness is too small, for example, when the maximum thickness is less than 0.5 mm, the mechanical strength of the tablet itself decreases, and the tablet is liable to be broken.

Figure 3A:
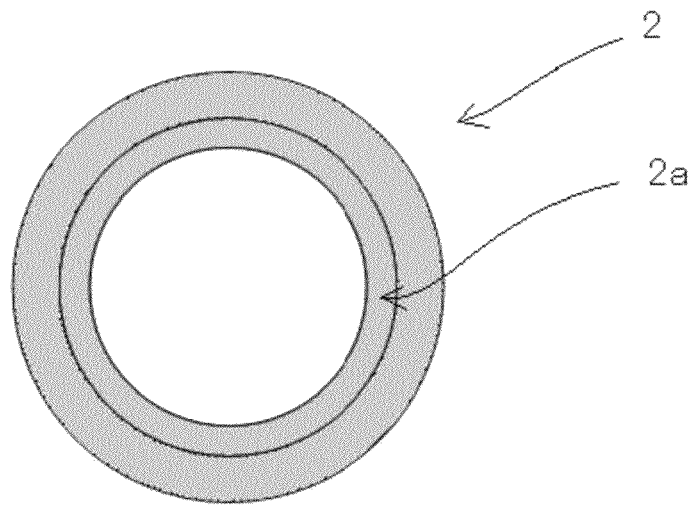
FIG. 3(a) is a schematic view showing a tablet of the present invention viewed from above.
Figure 3B:
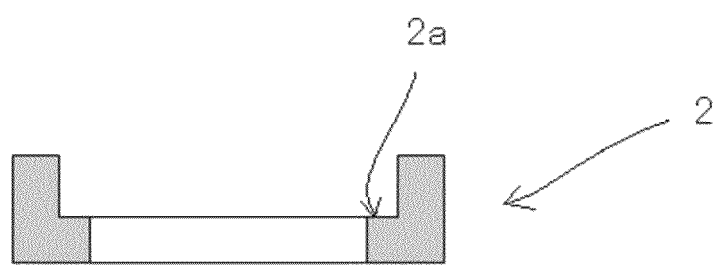
FIG. 3(b) is a schematic cross-sectional view showing the tablet of the present invention.

It is preferred that the tablet of the present invention have a recessed portion for accommodating an exhaust pipe. This allows a tablet component to be interposed between the front surface of the exhaust pipe and the glass substrate, and hence, the sealing strength of the exhaust pipe can be enhanced. FIG. 3(a) is a schematic view of this embodiment viewed from above, and FIG. 3(b) is a schematic cross-sectional view of this embodiment. As apparent from FIGS. 3(a) and 3(b), a tablet 2 is provided with a recessed portion, and an exhaust pipe is accommodated in the recessed portion. Specifically, by placing an exhaust pipe with an enlarged front end portion on a stepped surface 2a, the exhaust pipe can be accommodated in the recessed portion stably.

It is preferred that the tablet of the present invention be attached to an enlarged front end portion of an exhaust pipe so as to be used as an exhaust pipe integrated with a tablet. With such construction, it is not necessary to align the positions with respect to the exhaust hole as the center in three members, i.e., a glass substrate, a tablet, and an exhaust pipe, which can simplify the attachment of the exhaust pipe. Such the exhaust pipe integrated with a tablet can be produced by firing the tablet in contact with the front end portion of the exhaust pipe. Further, the exhaust pipe and the tablet can be adhered to each other by being fired at a temperature in the vicinity of the softening point of the tablet for about 5 to 10 minutes. In this case, such a method can be adopted that involves fixing the exhaust pipe with a jig and bringing the fixed exhaust pipe into contact with the tablet, followed by firing. It is preferred for the jig for fixing the exhaust pipe that a material to which the tablet is not fused be used, and for example, a carbon jig can be used.

As the exhaust pipe, $SiO_2$—$Al_2O_3$—$B_2O_3$-based glass containing a predetermined amount of an alkali metal oxide is preferred, and in particular, a glass cord "FE-2" manufactured by Nippon Electric Glass Co., Ltd. is preferred. Such the exhaust pipe has a thermal expansion coefficient of $85\times10^{-7}/°$C. and a heat-resistant temperature of 550° C., and has a dimension of an outer diameter of 5 mm and an inner diameter of 3.5 mm, for example. Further, the exhaust pipe preferably has a shape with an enlarged front end portion, more preferably has a shape with a flare portion or a flange portion in the front end portion. As a method involving enlarging the front end portion of the exhaust pipe, various methods can be adopted. In particular, such a method is excellent in mass productivity that involves heating the front end portion of the exhaust pipe with a gas burner while rotating the exhaust pipe and processing the heated front end portion into a predetermined shape using various kinds of jigs.

In the exhaust pipe integrated with a tablet according to the present invention, it is preferred that a tablet and a high-melting-point ring is provided to an enlarged front end portion of an exhaust pipe, wherein the tablet is positioned at a front side of the front end portion and the high-melting-point ring is positioned at a rear side of the front end portion. With such construction, when the exhaust pipe is attached to a glass substrate and the like, the area of the exhaust pipe with the tablet to be brought into contact with the glass substrate and the like is increased compared to the area of the exhaust pipe itself. Therefore, the exhaust pipe can be self-standing stably, and it becomes easy to attach the exhaust pipe in a perpendicular direction relative to the glass substrate and the like. Further, in the production process for the exhaust pipe integrated with a tablet, when the high-melting-point ring is interposed between the jig and the tablet during the adhesion of the tablet to the exhaust pipe, the exhaust pipe integrated with a tablet can be produced without using a special jig, which enhances the production efficiency of the exhaust pipe integrated with a tablet.

In the exhaust pipe integrated with a tablet in the above-mentioned construction, it is preferred that the tablet be adhered to the outer circumferential surface of the front end portion of the exhaust pipe, more preferably, the tablet is adhered to only the outer circumferential surface of the front end portion of the exhaust pipe without being adhered to the front surface of the front end portion of the exhaust pipe, that is, the surface to be adhered to the glass substrate and the like. This facilitates the prevention of the situation in which glass flows into an exhaust hole formed in the glass substrate and the like. Further, when the high-melting-point ring is fixed to the exhaust pipe through the tablet without being adhered directly to the exhaust pipe, the exhaust pipe can be sealed while the high-melting-point ring portion is fixed under pressure with a clip in the secondary firing step, which can enhance the sealing strength of the exhaust pipe.

Further, as a material for the high-melting-point ring, glass, ceramics, metal, or the like can be used. As the high-melting-point ring, ones which are obtained by processing glass cords "ST-4" and "FN-13" manufactured by Nippon Electric Glass Co., Ltd. are preferred. The high-melting-point ring can be produced by the same method as that of the tablet of the present invention.

It is preferred that the tablet of the present invention be used for sealing an exhaust pipe of a PDP. The tablet of the present invention is capable of sealing satisfactorily in the secondary firing step and is hard to be re-softened in the vacuum exhaust step. Therefore, the production efficiency and the brightness property of the PDP can be enhanced.

The tablet of the present invention can also be used for sealing exhaust pipes of a VFD and an FED. Each of production processes for these flat display devices also involves a vacuum exhaust step, and the production efficiency and brightness property can be enhanced by conducting the vacuum exhaust step at a high temperature.

Example 1

Hereinafter, the present invention is described in detail by way of examples.

Table 1 shows examples (Sample Nos. 2 to 7 and 9 to 14) and comparative examples (Sample Nos. 1 and 8) of the present invention, and in particular, shows the relationship between the content of alumina and the drawing property.

First, a glass batch in which materials such as various oxides and carbonates were blended so as to obtain each of glass compositions in the table was prepared, placed in a platinum crucible, and melted at 1000 to 1200° C. for 2 hours. Then, molten glass was formed into a thin section with a water-cooling roller. Finally, the glass of the thin section was crushed with a ball mill and allowed to pass through a sieve with an aperture of 200-mesh to obtain each bismuth-based glass powder with an average particle diameter $D_{50}$ of 10 μm. As a refractory filler, alumina powder (indicated by ALM in the table) with a 10% particle diameter $D_{10}$ of 2.7 μm, an average particle diameter $D_{50}$ of 7.7 μm, and a 90% particle diameter $D_{90}$ of 20.7 μm, and willemite powder (indicated by WIL in the table) with an average particle diameter $D_{50}$ of 10 μm were used. The bismuth-based glass powder and the refractory filler were mixed to obtain each mixed sample. Using each mixed sample, a tablet sample (Φ20 mm, 5 mm in thickness) having a filling ratio in the table was produced by a conventional method.

The flow diameter was evaluated as described below. Each tablet sample was mounted on a high-strain-point glass substrate (PP-8C manufactured by Nippon Electric Glass Co., Ltd.) and placed in a recirculating heat treating furnace. The temperature was raised at a rate of 10° C./min in air, kept at 510° C. for 20 minutes, and then lowered to room temperature at a rate of 10° C./min. Then, the diameter of the tablet after firing was measured. It should be noted that the flow diameter of 20 mm or more means that an exhaust pipe can be sealed.

The denitrification state was evaluated as described below. First, each mixed sample and a vehicle (α-terpineol containing an acrylic resin) were kneaded uniformly with a triple roll mill to obtain a paste. Then, the paste was applied on an end portion of a high-strain-point glass substrate (PP-8C manufactured by Nippon Electric Glass Co., Ltd.) linearly (40 mm in length by 3 mm in width by 1.5 mm in thickness), and the substrate was placed in a dry oven and dried at 150° C. for 10 minutes. Then, the temperature was raised from room temperature at 10° C./min, the substrate was fired at 510° C. for 20 minutes, and the temperature was then lowered to room temperature at 10° C./min. Finally, the surface of the obtained fired body was observed with an optical microscope (magnification: 50), and the case where no crystal was observed on

TABLE 1

| | | Comparative Example | Example | | | | | | | Comparative Example |
|---|---|---|---|---|---|---|---|---|---|---|
| | | 1 | 2 | 3 | 4 | 5 | 6 | 7 | 8 |
| Glass composition (mass %) | $Bi_2O_3$ | 76.4 | 76.4 | 76.4 | 76.4 | 76.4 | 76.4 | 76.4 | 76.4 |
| | $B_2O_3$ | 8.1 | 8.1 | 8.1 | 8.1 | 8.1 | 8.1 | 8.1 | 8.1 |
| | ZnO | 6.4 | 6.4 | 6.4 | 6.4 | 6.4 | 6.4 | 6.4 | 6.4 |
| | BaO | 5.8 | 5.8 | 5.8 | 5.8 | 5.8 | 5.8 | 5.8 | 5.8 |
| | CuO | 2.2 | 2.2 | 2.2 | 2.2 | 2.2 | 2.2 | 2.2 | 2.2 |
| | $Fe_2O_3$ | 0.5 | 0.5 | 0.5 | 0.5 | 0.5 | 0.5 | 0.5 | 0.5 |
| | $Sb_2O_3$ | 0.6 | 0.6 | 0.6 | 0.6 | 0.6 | 0.6 | 0.6 | 0.6 |
| Tablet | Glass (vol %) | 60.0 | 60.0 | 60.0 | 60.0 | 60.0 | 60.0 | 60.0 | 60.0 |
| | Refractory filler (vol %) | WIL 40.0 | ALM 5.0 WIL 35.0 | ALM 6.0 WIL 34.0 | ALM 7.0 WIL 33.0 | ALM 9.0 WIL 31.0 | ALM 11.0 WIL 29.0 | ALM 13.0 WIL 27.0 | ALM 26.0 WIL 14.0 |
| | Filling ratio (%) | 86 | 86 | 86 | 86 | 86 | 86 | 86 | 86 |
| | Flow diameter (mm) at 510° C. for 20 minutes | 24.8 | 22.9 | 22.2 | 22.2 | 21.5 | 21.3 | 20.9 | 17.6 |
| | Devitrification state | ○ | ○ | ○ | ○ | ○ | ○ | ○ | ○ |
| | Residual stress | ○ | ○ | ○ | ○ | ○ | ○ | ○ | ○ |
| | Drawing property | x | ○ | ○ | ○ | ○ | ○ | ○ | ○ | the surface was evaluated as Symbol "○", and the case where a crystal was observed on the surface was evaluated as Symbol "x".

The residual stress was evaluated as described below. Each tablet sample was mounted on a high-strain-point glass substrate (PP-8C manufactured by Nippon Electric Glass Co., Ltd.) and placed in a recirculating heat treating furnace. The temperature was raised at a rate of 10° C./min in air, kept at 510° C. for 20 minutes, and then lowered to room temperature at a rate of 10° C./min. Next, the case where there was no crack in the glass substrate immediately below the tablet after firing was evaluated as Symbol "○", and the case where a crack occurred was evaluated as Symbol "x".

the case where a sealing portion was drawn into the device, and airtight leakage occurred was evaluated as Symbol "x".

As apparent from Table 1, in Sample Nos. 2 to 7, the evaluations of the flow diameter, denitrification state, residual stress, and drawing property were satisfactory. In Sample No. 1, the evaluation of the drawing property was poor. In Sample No. 8, the evaluation of the flow diameter was poor.

Example 2

Table 2 shows examples (Sample Nos. 9 to 15) and comparative examples (Sample Nos. 16 and 17) of the present invention.

TABLE 2

|  |  | Example |  |  |  |  |  |  | Comparative Example |  |
|---|---|---|---|---|---|---|---|---|---|---|
|  |  | 9 | 10 | 11 | 12 | 13 | 14 | 15 | 16 | 17 |
| Glass composition (mass %) | $Bi_2O_3$ | 73.2 | 79.0 | 79.5 | 83.2 | 76.4 | 81.0 | 79.6 | 91.0 | 75.0 |
|  | $B_2O_3$ | 7.5 | 8.5 | 9.0 | 9.5 | 8.1 | 10.0 | 6.5 | 8.0 | 7.5 |
|  | ZnO | 10.2 | 7.5 | 6.5 | 5.5 | 6.4 | 7.0 | 10.1 | 1.0 | 17.5 |
|  | BaO | 6.0 | — | 3.0 | 0.2 | 5.8 | — | — | — | — |
|  | CuO | 2.2 | 2.0 | — | 1.0 | 2.2 | — | 0.4 | — | — |
|  | $Fe_2O_3$ | 0.5 | 0.5 | — | 0.2 | 0.5 | — | 0.2 | — | — |
|  | $CeO_2$ | — | 0.5 | 0.5 | 0.2 | — | 0.5 | 0.2 | — | — |
|  | $Sb_2O_3$ | — | — | — | 0.2 | 0.6 | 0.5 | — | — | — |
|  | $SiO_2$ | 0.2 | 1.0 | 1.0 | — | — | 0.5 | 1.5 | — | — |
|  | $Al_2O_3$ | 0.2 | 1.0 | 1.0 | — | — | 0.5 | 1.5 | — | — |
| Tablet | Glass (vol %) | 75.0 | 65.0 | 65.0 | 68.0 | 68.4 | 65.0 | 70.0 | 63.0 | 63.0 |
|  | Refractory filler (vol %) | ALM 5.0 CDR 20.0 | ALM 5.0 WIL 30.0 | ALM 5.0 WIL 30.0 | ALM 5.0 CDR 25.0 $SnO_2$ 2.0 | ALM 4.5 WIL 27.1 | ALM 5.0 WIL 30.0 | ALM 2.0 WIL 28.0 | ALM 7.0 WIL 30.0 | ALM 7.0 WIL 30.0 |
|  | Filling ratio (%) | 86 | 86 | 86 | 86 | 86 | 86 | 86 | 86 | 86 |
|  | Flow diameter (mm) at 510° C. for 20 minutes | 22.7 | 21.3 | 21.4 | 23.2 | 23.8 | 22.7 | 23.3 | 17.6 | 17.6 |
|  | Devitrification state | ○ | ○ | ○ | ○ | ○ | ○ | ○ | x | x |
|  | Residual stress | ○ | ○ | ○ | ○ | ○ | ○ | ○ | — | — |
|  | Drawing property | ○ | ○ | ○ | ○ | ○ | ○ | Δ | ○ | ○ |

The drawing property was evaluated as described below. First, each sample and a vehicle (α-terpineol containing an acrylic resin) were kneaded uniformly with a triple roll mill to obtain a paste. Then, the paste was applied linearly (40 mm in length by 3 mm in width by 1.5 mm in thickness) on an outer circumferential edge of a high-strain-point glass substrate (PP-8C manufactured by Nippon Electric Glass Co., Ltd.) of 100 mm by 100 mm by 1.8 mm in thickness having an exhaust hole with 5 mmΦ, and the substrate was placed in a dry oven and dried at 150° C. for 10 minutes. Next, a high-strain-point glass substrate (PP-8C manufactured by Nippon Electric Glass Co., Ltd.) of 100 mm by 100 mm by 1.8 mm in thickness was laminated precisely on the obtained dried film. After that, under pressure with a clip or the like, the temperature was raised from room temperature at 10° C./min, the substrate was fired at 510° C. for 20 minutes, and the temperature was then lowered to room temperature at 10° C./min. Then, the obtained glass container was exhausted in vacuum with a vacuum pump through an exhaust hole. The vacuum exhaust was conducted at 480° C. for 40 minutes so that the inside of the device had a pressure of $10^{-6}$ Torr. After that, the inside of the glass container was observed. The case where no airtight leakage due to the drawing occurred in the sealing portion was evaluated as Symbol "○", the case where a sealing portion was drawn into the device so that a portion with an extremely small sealing width was generated, although no airtight leakage occurred, was evaluated as Symbol "Δ", and First, a glass batch in which materials such as various oxides and carbonates were blended so as to obtain each of glass compositions in the table was prepared and placed in a platinum crucible, and melted at 1000 to 1200° C. for 2 hours. Then, molten glass was formed into a thin section with a water-cooling roller. Finally, the glass in a thin section was crushed with a ball mill and allowed to pass through a sieve with an aperture of 200-mesh to obtain each bismuth-based glass powder with an average particle diameter $D_{50}$ of 10 μm. As a refractory filler, alumina powder (indicated by ALM in the table) with a 10% particle diameter $D_{10}$ of 2.7 μm, an average particle diameter $D_{50}$ of 7.7 μm, and a 90% particle diameter $D_{90}$ of 20.7 μm, and willemite powder (indicated by WIL in the table) with an average particle diameter $D_{50}$ of 10 μm, cordierite powder (indicated by CDR in the table) with an average particle diameter $D_{50}$ of 10 μm, and tin oxide powder (indicated by $SnO_2$ in the table) with an average particle diameter $D_{50}$ of 10 μm were used. The bismuth-based glass powder and the refractory filler were mixed to obtain each mixed sample. Using each mixed sample, a tablet sample (Φ20 mm, 5 mm in thickness) having a filling ratio in the table was produced by a conventional method.

The flow diameter was evaluated as described below. Each tablet sample was mounted on a high-strain-point glass substrate (PP-8C manufactured by Nippon Electric Glass Co., Ltd.) and placed in a recirculating heat treating furnace. The temperature was raised at a rate of 10° C./min, kept at 510° C.

for 20 minutes, and then lowered to room temperature at a rate of 10° C./min. Then, the diameter of the tablet after firing was measured.

The denitrification state was evaluated as described below. First, each mixed sample and a vehicle (α-terpineol containing an acrylic resin) were kneaded uniformly with a triple roll mill to obtain a paste. Then, the paste was applied linearly (40 mm in length by 3 mm in width by 1.5 mm in thickness) on an end portion of a high-strain-point glass substrate (PP-8C manufactured by Nippon Electric Glass Co., Ltd.), and the substrate was placed in a dry oven and dried at 150° C. for 10 minutes. Then, the temperature was raised from room temperature at 10° C./min, the substrate was fired at 510° C. for 20 minutes, and the temperature was then lowered to room temperature at 10° C./min. Finally, the surface of the obtained fired body was observed with an optical microscope (magnification: 50), and the case where no crystal was observed on the surface was evaluated as Symbol "○", and the case where a crystal was observed on the surface was evaluated as Symbol "x".

The residual stress was evaluated as described below. Each tablet sample was mounted on a high-strain-point glass substrate (PP-8C manufactured by Nippon Electric Glass Co., Ltd.) and placed in a recirculating heat treating furnace. The temperature was raised at a rate of 10° C./min, kept at 510° C. for 20 minutes, and then lowered to room temperature at a rate of 10° C./min. Next, the case where no crack occurred in the glass substrate immediately below the tablet after firing was evaluated as Symbol "○", and the case where a crack occurred was evaluated as Symbol "x".

The drawing property was evaluated as described below. First, each sample and a vehicle (α-terpineol containing an acrylic resin) were kneaded uniformly with a triple roll mill to obtain a paste. Then, the paste was applied linearly (40 mm in length by 3 mm in width by 1.5 mm in thickness) on an outer circumferential edge of a high-strain-point glass substrate (PP-8C manufactured by Nippon Electric Glass Co., Ltd.) of 100 mm by 100 mm by 1.8 mm in thickness having an exhaust hole with 5 mmΦ, and the substrate was placed in a dry oven and dried at 150° C. for 10 minutes. Next, a high-strain-point glass substrate (PP-8C manufactured by Nippon Electric Glass Co., Ltd.) of 100 mm by 100 mm by 1.8 mm in thickness was laminated precisely on the obtained dried film. After that, under pressure with a clip or the like, the temperature was raised from room temperature at 10° C./min, the substrate was fired at 510° C. for 20 minutes, and the temperature was lowered to room temperature at 10° C./min. Then, the obtained glass container was exhausted in vacuum with a vacuum pump through the exhaust hole. The vacuum exhaust was conducted at 480° C. for 40 minutes so that the inside of the device had a pressure of $10^{-6}$ Torr. After that, the inside of the glass container was observed. The case where no airtight leakage due to the drawing occurred in the sealing portion was evaluated as Symbol "○", the case where a sealing portion was drawn into the device so that a portion with an extremely small sealing width was generated, although no airtight leakage occurred, was evaluated as Symbol "Δ", and the case where a sealing portion was drawn into the device, and airtight leakage occurred was evaluated as Symbol "x".

As apparent from Table 2, in Sample Nos. 9 to 15, the evaluations of the flow diameter, devitrification state, residual stress, and drawing property were satisfactory. In Sample Nos. 16 and 17, the evaluations of the flow diameter and devitrification state were poor.

Example 3

Table 3 shows examples (Sample Nos. 19 to 24) and comparative examples (Sample No. 18) of the present invention, and in particular, shows the relationship between the filling ratio of the tablet and the sealing strength.

TABLE 3

|  |  | Comparative Example | Example | | | | | |
|---|---|---|---|---|---|---|---|---|
|  |  | 18 | 19 | 20 | 21 | 22 | 23 | 24 |
| Glass composition (mass %) | $Bi_2O_3$ | 76.4 | 76.4 | 76.4 | 76.4 | 76.4 | 76.4 | 76.4 |
|  | $B_2O_3$ | 8.1 | 8.1 | 8.1 | 8.1 | 8.1 | 8.1 | 8.1 |
|  | ZnO | 6.4 | 6.4 | 6.4 | 6.4 | 6.4 | 6.4 | 6.4 |
|  | BaO | 5.8 | 5.8 | 5.8 | 5.8 | 5.8 | 5.8 | 5.8 |
|  | CuO | 2.2 | 2.2 | 2.2 | 2.2 | 2.2 | 2.2 | 2.2 |
|  | $Fe_2O_3$ | 0.5 | 0.5 | 0.5 | 0.5 | 0.5 | 0.5 | 0.5 |
|  | $Sb_2O_3$ | 0.6 | 0.6 | 0.6 | 0.6 | 0.6 | 0.6 | 0.6 |
| Tablet | Glass (vol %) | 58.0 | 58.0 | 58.0 | 58.0 | 58.0 | 58.0 | 58.0 |
|  | Refractory filler (vol %) | ALM 6.5 WIL 35.5 | ALM 6.5 WIL 35.5 | ALM 6.5 WIL 35.5 | ALM 6.5 WIL 35.5 | ALM 6.5 WIL 35.5 | ALM 6.5 WIL 35.5 | ALM 6.5 WIL 35.5 |
|  | Filling ratio (%) | 70 | 80 | 83 | 86 | 87 | 89 | 92 |
|  | Flow diameter (mm) at 510° C. for 20 minutes | 18.0 | 20.0 | 21.3 | 22.2 | 22.8 | 23.6 | 24.0 |
|  | Sealing strength | x | ○ | ○ | ○ | ○ | ○ | ○ |
|  | Drawing property | — | ○ | ○ | ○ | ○ | ○ | ○ |

First, a glass batch in which materials such as various oxides and carbonates were blended so as to obtain each of glass compositions in the table was prepared, placed in a platinum crucible, and melted at 1000 to 1200° C. for 2 hours. Then, molten glass was formed into a thin section with a water-cooling roller. Finally, the glass in a thin section was crushed with a ball mill and allowed to pass through a sieve with an aperture of 200-mesh to obtain each bismuth-based glass powder with an average particle diameter $D_{50}$ of 10 μm. As a refractory filler, alumina powder (indicated by ALM in the table) with a 10% particle diameter $D_{10}$ of 2.7 μm, an average particle diameter $D_{50}$ of 7.7 μm, and a 90% particle diameter $D_{90}$ of 20.7 μm, and willemite powder (indicated by WIL in the table) with an average particle diameter $D_{50}$ of 10 μm were used. The bismuth-based glass powder and the refractory filler were mixed to obtain each mixed sample. Using each mixed sample, a tablet sample (Φ20 mm, 5 mm in thickness) having a filling ratio in the table was produced by a conventional method.

The flow diameter was evaluated as described below. Each tablet sample was mounted on a high-strain-point glass substrate (PP-8C manufactured by Nippon Electric Glass Co., Ltd.), and the substrate was placed in a recirculating heat treating furnace. The temperature was raised at a rate of 10° C./min, kept at 510° C. for 20 minutes, and then lowered to room temperature at a rate of 10° C./min. Then, the diameter of the tablet after firing was measured.

The sealing strength was evaluated as described below. First, each tablet sample was mounted at the center of a high-strain-point glass substrate (PP-8C manufactured by Nippon Electric Glass Co., Ltd.) of 30 mm by 30 mm. Next, the substrate was placed in a recirculating heat treating furnace. The temperature was raised at a rate of 10° C./min in air, kept at 500° C. for 20 minutes, and then lowered to room temperature at a rate of 10° C./min. Finally, an operation of dropping the sample after firing onto concrete from a height of 1 m was repeated 10 times. The case where the tablet and the glass substrate were not detached from each other was evaluated as Symbol "○", the case where a crack occurred at an interface between the tablet and the glass substrate was evaluated as Symbol "Δ", and the case where the tablet and the glass substrate were detached from each other was evaluated as Symbol "x".

The drawing property was evaluated as described below. First, each sample and a vehicle (α-terpineol containing an acrylic resin) were kneaded uniformly with a triple roll mill to obtain a paste. Then, the paste was applied linearly (40 mm in length by 3 mm in width by 1.5 mm in thickness) on an outer circumferential edge of a high-strain-point glass substrate (PP-8C manufactured by Nippon Electric Glass Co., Ltd.) of 100 mm by 100 mm by 1.8 mm in thickness having an exhaust hole with 5 mmΦ, and the substrate was placed in a dry oven and dried at 150° C. for 10 minutes. Next, a high-strain-point glass substrate (PP-8C manufactured by Nippon Electric Glass Co., Ltd.) of 100 mm by 100 mm by 1.8 mm in thickness was laminated precisely on the obtained dried film. After that, under pressure with a clip or the like, the temperature was raised from room temperature at 10° C./min, the substrate was fired at 510° C. for 20 minutes, and the temperature was then lowered to room temperature at 10° C./min. Then, the obtained glass container was exhausted in vacuum with a vacuum pump through the exhaust hole. The vacuum exhaust was conducted at 480° C. for 40 minutes so that the inside of the device had a pressure of $10^{-6}$ Torr. After that, the inside of the glass container was observed. The case where no airtight leakage due to the drawing occurred in the sealing portion was evaluated as Symbol "○", the case where a sealing portion was drawn into the device so that a portion with an extremely small sealing width was generated, although no airtight leakage occurred, was evaluated as Symbol "Δ", and the case where a sealing portion was drawn into the device, and airtight leakage occurred was evaluated as Symbol "x".

As apparent from Table 3, in Sample Nos. 19 to 24, the evaluations of the flow diameter, sealing state, and drawing property were satisfactory. In Sample No. 18, the evaluations of the flow diameter and sealing strength were poor.

Example 4

Table 4 shows examples (Sample Nos. 25 to 31) of the present invention, and in particular, shows the effect of the particle diameter of alumina.

TABLE 4

|  |  | Example | | | | | | |
|---|---|---|---|---|---|---|---|---|
|  |  | 25 | 26 | 27 | 28 | 29 | 30 | 31 |
| Glass composition (mass %) | $Bi_2O_3$ | 76.4 | 76.4 | 76.4 | 76.4 | 76.4 | 76.4 | 76.4 |
|  | $B_2O_3$ | 8.1 | 8.1 | 8.1 | 8.1 | 8.1 | 8.1 | 8.1 |
|  | ZnO | 6.4 | 6.4 | 6.4 | 6.4 | 6.4 | 6.4 | 6.4 |
|  | BaO | 5.8 | 5.8 | 5.8 | 5.8 | 5.8 | 5.8 | 5.8 |
|  | CuO | 2.2 | 2.2 | 2.2 | 2.2 | 2.2 | 2.2 | 2.2 |
|  | $Fe_2O_3$ | 0.5 | 0.5 | 0.5 | 0.5 | 0.5 | 0.5 | 0.5 |
|  | $Sb_2O_3$ | 0.6 | 0.6 | 0.6 | 0.6 | 0.6 | 0.6 | 0.6 |
| Tablet | Glass (vol %) | 58.0 | 58.0 | 58.0 | 58.0 | 58.0 | 58.0 | 58.0 |
|  | Refractory filler (vol %) | ALM 6.5 WIL 35.5 | ALM 6.5 WIL 35.5 | ALM 6.5 WIL 35.5 | ALM 6.5 WIL 35.5 | ALM 6.5 WIL 35.5 | ALM 6.5 WIL 35.5 | ALM 6.5 WIL 35.5 |
|  | Filling ratio (%) | 86 | 86 | 86 | 86 | 86 | 86 | 86 |
|  | Particle diameter of alumina (μm) $D_{10}$ | 0.5 | 1.8 | 2.1 | 2.7 | 3.6 | 4.5 | 6.1 |
|  | $D_{50}$ | 2.5 | 5.9 | 6.6 | 7.7 | 10.1 | 12.1 | 25.1 |
|  | $D_{90}$ | 8.1 | 15.1 | 18.0 | 20.7 | 32.1 | 34.5 | 53.5 |
|  | Flow diameter (mm) at 510° C. for 20 minutes | 18.6 | 21.1 | 21.5 | 22.2 | 23.0 | 23.5 | 23.9 |
|  | Sealing strength | Δ | ○ | ○ | ○ | ○ | ○ | ○ |
|  | Drawing property | ○ | ○ | ○ | ○ | ○ | ○ | Δ |

First, a glass batch in which materials such as various oxides and carbonates were blended so as to obtain each of glass compositions in the table was prepared, placed in a platinum crucible, and melted at 1000 to 1200° C. for 2 hours. Then, molten glass was formed into a thin section with a water-cooling roller. Finally, the glass in a thin section was crushed with a ball mill and allowed to pass through a sieve with an aperture of 200-mesh to obtain each bismuth-based glass powder with an average particle diameter $D_{50}$ of 10 μm. As a refractory filler, alumina powder (indicated by ALM in the table) with particle diameters in the table, and willemite powder (indicated by WIL in the table) with an average particle diameter $D_{50}$ of 10 μm were used. The bismuth-based glass powder and the refractory filler were mixed to obtain each mixed sample. Using each mixed sample, a tablet sample (Φ20 mm, 5 mm in thickness) having a filling ratio in the table was produced by a conventional method.

The flow diameter was evaluated as described below. Each tablet sample was mounted on a high-strain-point glass substrate (PP-8C manufactured by Nippon Electric Glass Co., Ltd.) and placed in a recirculating heat treating furnace. The temperature was raised at a rate of 10° C./min, kept at 510° C. for 20 minutes, and then lowered to room temperature at a rate of 10° C./min. Then, the diameter of the tablet after firing was measured.

The sealing strength was evaluated as described below. First, each tablet sample was mounted at the center of a high-strain-point glass substrate (PP-8C manufactured by Nippon Electric Glass Co., Ltd.) of 30 mm by 30 mm. Next, the sample was placed in a recirculating heat treating furnace, the temperature was raised at a rate of 10° C./min in air, kept at 500° C. for 20 minutes, and then lowered to room temperature at a rate of 10° C./min. Finally, an operation of dropping the sample after firing onto concrete from a height of 1 m was repeated 10 times. The case where the tablet and the glass substrate were not detached from each other was evaluated as Symbol "○", the case where a crack occurred at an interface between the tablet and the glass substrate was evaluated as Symbol "Δ", and the case where the tablet and the glass substrate were detached from each other was evaluated as Symbol "x".

The drawing property was evaluated as described below. First, each sample and a vehicle (α-terpineol containing an acrylic resin) were kneaded uniformly with a triple roll mill to obtain a paste. Then, the paste was applied linearly (40 mm in length by 3 mm in width by 1.5 mm in thickness) onto an outer circumferential edge of a high-strain-point glass substrate (PP-8C manufactured by Nippon Electric Glass Co., Ltd.) 100 mm by 100 mm by 1.8 mm in thickness having an exhaust hole with 5 mmΦ, and the substrate was placed in a dry oven and dried at 150° C. for 10 minutes. Next, a high-strain-point glass substrate (PP-8C manufactured by Nippon Electric Glass Co., Ltd.) of 100 mm by 100 mm by 1.8 mm in thickness was laminated precisely on the obtained dried film. After that, under pressure with a clip or the like, the temperature was raised from room temperature at 10° C./min, the substrate was fired at 510° C. for 20 minutes, and the temperature was then lowered to room temperature at 10° C./min. Then, the obtained glass container was exhausted in vacuum with a vacuum pump through the exhaust hole. The vacuum exhaust was conducted at 480° C. for 40 minutes so that the inside of the device had a pressure of $10^{-6}$ Torr. After that, the inside of the glass container was observed. The case where no airtight leakage due to the drawing occurred in the sealing portion was evaluated as Symbol "○", the case where a sealing portion was drawn into the device so that a portion with an extremely small sealing width was generated, although no airtight leakage occurred, was evaluated as Symbol "Δ", and the case where a sealing portion was drawn into the device, and airtight leakage occurred was evaluated as Symbol "x".

In [Example 1] to [Example 4], for convenience of the experiments, tablets with Φ20 mm and 5 mm in thickness and the like were used. However, it is considered that the same tendency is obtained even with a tablet having a through-hole and a tablet having a recessed portion for accommodating an exhaust pipe.

The tablet of the present invention is suitable for sealing exhaust pipes of a PDP, an FED, and a VFD. In addition, the tablet of the present invention is also applicable to the sealing of an organic electroluminescence display, an inorganic electroluminescence display, various ceramic packages such as an IC ceramic package, and various metal packages such as a spherical lens cap component.

The invention claimed is:

1. A tablet, comprising:
   bismuth-based glass; and
   a refractory filler, wherein
   the bismuth-based glass comprises, as a glass composition, in terms of mass %, 70 to 90% of $Bi_2O_3$, 2 to 12% of $B_2O_3$, 0 to 5% of $Al_2O_3$, 1 to 15% of ZnO, 0 to 10% of BaO, and 0 to 8% of $CuO+Fe_2O_3$,
   the tablet comprises 1 to 25 vol % of alumina as the refractory filler, a specific surface area of the alumina being 0.1 to 3 $m^2/g$,
   the tablet has a filling ratio of 71% or more, and
   the alumina has a 10% particle diameter $D_{10}$ of 0.1 to 5 μm, an average particle diameter $D_{50}$ of 1 to 10 μm, and a 90% particle diameter $D_{90}$ of 10 to 30 μm.

2. The tablet according to claim 1, wherein a content of the bismuth-based glass is 40 to 90 vol % and a content of the refractory filler is 10 to 60 vol %.

3. The tablet according to claim 1, further comprising a through-hole.

4. The tablet according to claim 1, wherein the tablet has a maximum thickness of 2 mm or less.

5. The tablet according to claim 1, wherein the tablet is substantially free of PbO.

6. The tablet according to claim 1, wherein the tablet is configured to be used for sealing an exhaust pipe.

7. The tablet according to claim 1, further comprising a recessed portion configured to accommodate an exhaust pipe.

8. The tablet according to claim 1, wherein the tablet is configured to be used for sealing an exhaust pipe of a plasma display panel.

9. An exhaust pipe integrated with a tablet, comprising the tablet according to claim 1, the tablet being attached to an enlarged front end portion of the exhaust pipe.

10. An exhaust pipe integrated with a tablet, comprising the tablet according to claim 1 and a high-melting-point ring, each of which is attached to an enlarged front end portion of the exhaust pipe, wherein the tablet is disposed at a front side of the enlarged front end portion and the high-melting-point ring is positioned at a rear side of the enlarged front end portion.

* * * * *